United States Patent [19]
Sigg

[11] 3,905,250
[45] Sept. 16, 1975

[54] GEAR ASSEMBLIES
[75] Inventor: Hans Sigg, Mutschellen, Switzerland
[73] Assignee: Maag Gear-Wheel & Machine Co., Ltd., Zurich, Switzerland
[22] Filed: Aug. 2, 1974
[21] Appl. No.: 494,280

[30] Foreign Application Priority Data
Dec. 19, 1973 Switzerland...................... 17837/73
Mar. 3, 1974 Netherlands...................... 7403709
Feb. 22, 1974 Sweden........................... 7402 4100
Feb. 1, 1974 France............................. 74.03502
July 2, 1974 Italy................................. 24693/74
Mar. 25, 1974 Japan.............................. 49-32706

[52] U.S. Cl............... 74/665 B; 74/410; 74/665 N; 74/665 P
[51] Int. Cl.² ..................... F16H 73/06; F16H 57/00
[58] Field of Search ........... 74/410, 665 GA, 665 B, 74/665 N, 665 P

[56] References Cited
UNITED STATES PATENTS
2,225,863 12/1940 Halford et al........................ 74/410
3,036,475 5/1962 Haupt ......................... 74/665 GA X
3,707,212 12/1972 Durand............................. 74/410 X

*Primary Examiner*—Leonard H. Gerin
*Attorney, Agent, or Firm*—Toren, McGeady and Stanger

[57] ABSTRACT

A gear assembly has the drive from a driving shaft transmitted to a driven shaft through two parallel intermediate shafts. To adjust the position of the driving shaft automatically for equalisation of the load distribution between the intermediate shafts and driving shaft is mounted in radial support bearings having elements permitting pivoting of the shaft about an axis parallel to the shaft axis, said pivoting axis lying on a line through the shaft axis and parallel to the resultant of equal gear tooth forces applied by respective gearwheels on the intermediate shafts to their meshing gearwheel on the driving shaft.

4 Claims, 6 Drawing Figures

GEAR ASSEMBLIES

BACKGROUND OF THE INVENTION

This invention relates to a gear assembly having at least two intermediate shafts arranged in parallel and driven from a common input or driving shaft. Gear assemblies of this type are often referred to as "single reduction locked train gears" and are mainly used with high output transmissions for marine drives.

It is known to make the driving shaft of such a gear assembly automatically adjustable relative to the intermediate shafts transverse to the axis of the driving shaft to equalise the load distribution between the intermediate shafts, the driving shaft being offset from the plane containing the two axes of the intermediate shafts and being adjustable perpendicularly or almost perpendicularly of the resultant of two equal forces applied by gearwheels on the intermediate shaft to a gearwheel on the driving shaft. It can be shown that said resultant can be resolved into a force and a moment in which the force acts on a line that (a) lies in a direction parallel to the resultant, (b) passes through the driving wheel shaft, and (c) is at an angle, equal to the pressure angle, to a line connecting the axes of the two intermediate shafts.

Such a gear having equal load distribution is for example known from U.K. Patent Specification No. 938 934. In one arrangement there, the adjustablity of the driving gear shaft is about an axis which is located outside the bearing for the driving gear and requires a separate shaft and suitable bearings. Another arrangement described for the automatic adjustment involves the provision of a resilient web which lies on the line of action of the resultant and there is also described the possibility of using a rectilinear guide to provide said adjustability.

In another known arrangement described in U.K. Patent Specification No. 1 236 519 (or Japanese Patent Specification No. 659 165) the adjustability is obtained by two straight sliding guideways for the forward and reverse directions of rotation respectively of the driving shaft. Said guideways would however be subject to considerable frictional forces which can hinder, even if they do not actually prevent, free and automatic adjustment of the driving shaft to obtain the required balancing of the load.

It is an object of the invention to provide a means of adjustment minimising these frictional forces.

It is a further object of the invention to provide a means of adjustment that provides for load balancing in both directions of rotation.

SUMMARY OF THE INVENTION

According to the present invention there is provided a gear assembly in which a drive from a driving shaft is transmitted by a gearwheel thereon respective gearwheels on at least two intermediate shafts arranged in parallel, and in which the driving shaft is adapted to be automatically adjustable transverse to its axis to equalise the load distribution between said intermediate shafts, the driving shaft axis being offset to one side of the plane containing the axes of the intermediate shafts and being displaceable substantially perpendicularly to the resultant of two equal forces applied to the driving shaft gearwheel by the intermediate shaft gearwheels, the driving shaft being mounted in radial support bearings in which bearing elements are arranged to permit pivoting of said shaft about an axis parallel to the shaft axis for said automatic adjustment, said pivoting axis being disposed on a line passing through the driving shaft axis and parallel to said resultant.

The radial bearings are advantageously constructed as tilting segment bearings for said pivoting freedom of the shaft, and each tilting segment bearing can comprise a rotary bearing segment having a tilting element formed by a longitudinal protrusion or rib on the segment outer periphery. If it is required to provide for load balancing in both directions of rotation of the driving shaft, two such tilting elements can be provided.

An embodiment of the invention will be described by way of example with reference to the accompanying diagrammatic drawings.

DESCRIPTION OF THE PREFERRED EMBODIMENT

Figure 1:
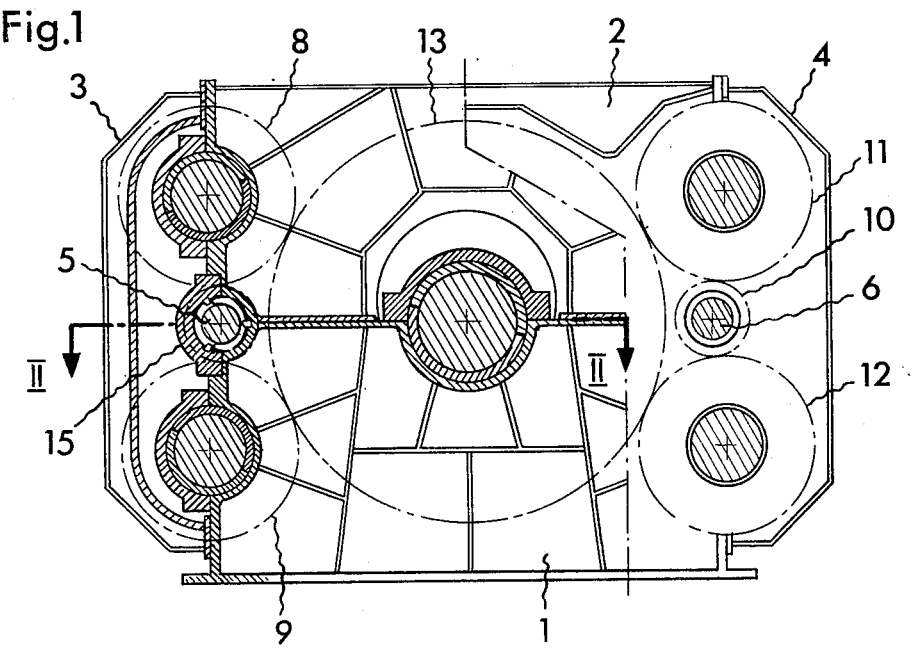
FIGS. 1 and 2 are cross-sectional views, on the line I—I in FIG. 2 and II—II in FIG. 1, respectively, of a gear assembly according to the invention.
Figure 2:
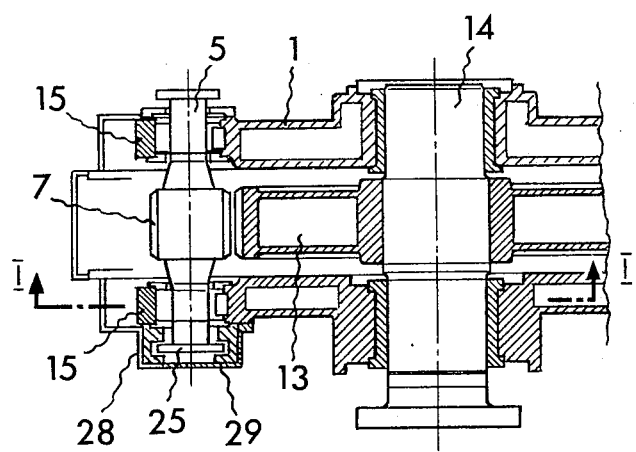

Referring more particularly to FIGS. 1 and 2, the assembly comprises a gear casing 1, an associated main cover 2, a left-hand side cover 3 and a right-hand side cover 4. Mounted in the casing 1 are a left-hand driving shaft 5 and a right-hand driving shaft 6. A driving gear 7 on the shaft 5 imparts its drive to intermediate gears 8 and 9, and similarly a driving gear 10 on the shaft 6 imparts its drive to intermediate gears 11 and 12, which are mounted on shafts parallel to one another. The driving shafts 6 and 7 are respectively offset laterally from the plane containing the shafts of their associated pair of intermediate gears 8, 9 and 11, 12. The intermediate gears 8, 9 and 11, 12 drive a driven gear 13 which is mounted on an output shaft 14.

It will be noted that the arrangement of the driving and intermediate shafts in the assembly is symmetrical and similarly the shafts are mounted in the same way on each side of the assembly. It will therefore suffice to describe in detail the manner of mounting of only one of the driving shafts, namely the left-hand shaft 5 shown in FIGS. 2, 5 and 6.

The shaft 5 is held by a bearing cover 15 in two tilting segments 16 and 17 which are fixed against rotation about the axis of the shaft by keys 18, 19 and 20. Arranged at positions 21 and 22 on the bearing circumference, are protrusions or ribs 23 and 24, exemplified as integral portions of the segments 16 and 17, which provide tilting edges parallel to the shaft axes. The driving shaft 5 is in addition axially located by means of a flange 25, axial bearings 26, axial bearing discs 27 and containing rim 28 and cover 29.

Figure 3:
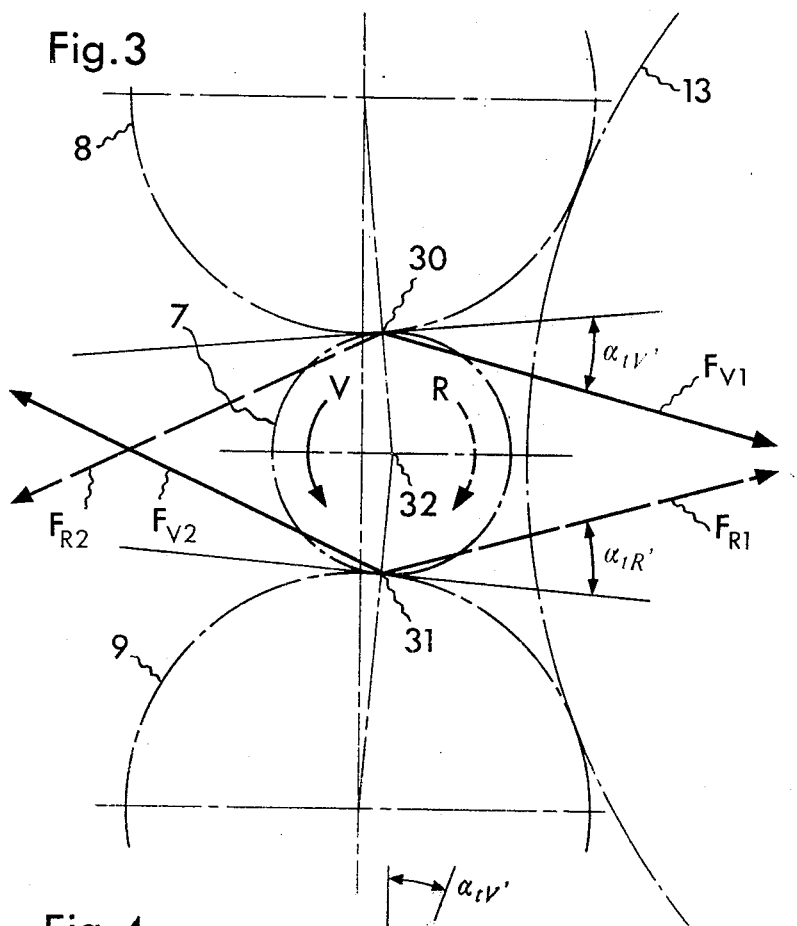
FIG. 3 shows the distribution of forces between the driving gear and its meshing gears on the two parallel intermediate shafts of the assembly in FIGS. 1 and 2.
Figure 4:
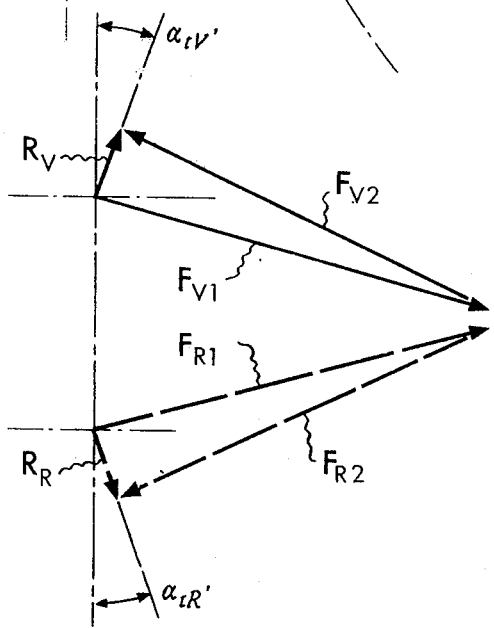
FIG. 4 is a force distribution diagram supplementing FIG. 3.

Shown in FIGS. 3 and 4 are the forces acting on the driving gear 7 and thus also on the driving shaft 5, and the force distribution, when the load is equally shared by the two intermediate shafts. The forces corresponding to a "forward" direction of rotation of the driving shaft, identified by the arrow V, are shown in full lines, while those forces which correspond to the "reverse" direction of rotation of the shaft, identified by the arrow R, are shown in broken lines.

The tangential forces of equal magnitude which act on the driving gear 7 with equal load distribution are indicated by $F_{V1}$ and $F_{V2}$ for the forward direction of rotation. The directions of these forces depends on the pressure angle $\alpha_{tV}$, and corresponds in each case to the transverse line of action between the driving gear 7 and the respective intermediate gear 8 or 9. For the "rearward" direction of rotation these tangential forces of equal magnitude are indicated by $F_{R1}$ and $F_{R2}$ and the pressure angle in this case is indicated by $\alpha_{tR'}$.

Figure 5:
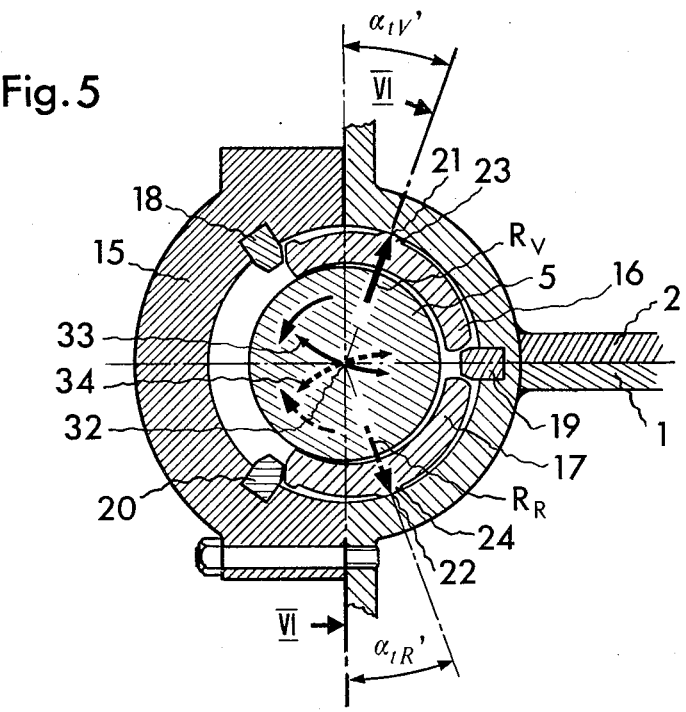
FIGS. 5 and 6 are cross-sectional views of one of the bearings of the driving gear shaft in the assembly of FIGS. 1 and 2, the sections being on the lines V—V in FIG. 6 and VI—VI in FIG. 5 respectively, and the sectional planes of FIGS. 5 and 6 being partly the same as those of FIGS. 1 and 2 respectively.
Figure 6:
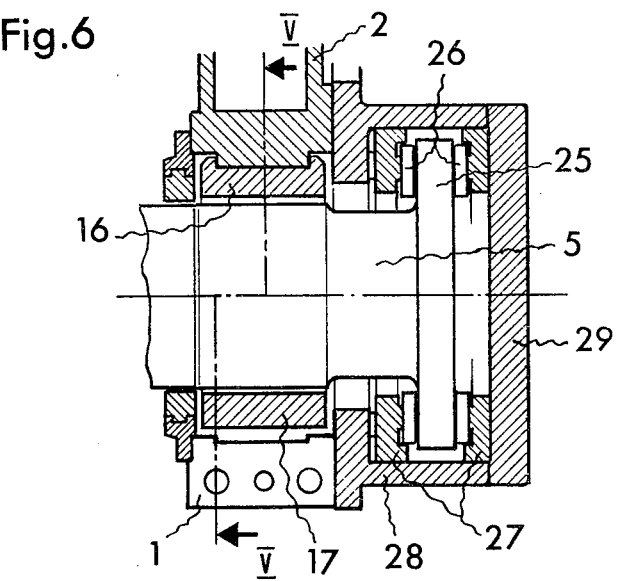

If the triangles of forces for the pitch points 30 and 31 are constructed (FIG. 4) then a force $R_V$ is obtained as a resultant with the forward direction of rotation. For the reverse direction of rotation, the resultant $R_R$ is obtained. These resultants $R_V$ and $R_R$ comprise translational components that act radially on the driving gear shaft 5. Relative to the line connecting the axes of the intermediate gears 8 and 9 the resultant $R_V$ and $R_R$ respectively subtend an angle corresponding to the pressure angle $\alpha_{tV'}$ or $\alpha_{tR'}$. Also, as already indicated, said translational force represented by the resultant $R_V$ for the forward direction of rotation or $R_R$ for the reverse direction of rotation lies on a respective radial line through the axis 32 of the driving gear shaft 5, as is indicated in FIG. 5.

If now the tilting edge, i.e. the longitudinal rib 23 for the forward direction of rotation, is arranged on the radial line which is situated parallel to the resultant $R_V$, then the driving shaft 5 is pivotable on said edge in the direction of the arrow 33 if inequality of the loads on the intermediate shafts changes the direction of action of the resultant $R_V$. For the reverse direction of rotation, the tilting edge or longitudinal rib 24 is arranged on that radial line which is parallel to the resultant $R_R$ and the driving shaft 5 is pivotable on said edge in the direction of the arrow 34.

With such freedom of adjustability of the driving shaft 5 in the direction of the arrow 33 for the forward direction of rotation, or arrow 34 for the reverse direction of rotation, the adjustment occurring transverse to the driving shaft 5, equalisation is obtained of the force $F_{V1}$, $F_{V2}$ or $F_{R1}$, $F_{R2}$, respectively, on the intermediate gears 8 and 9. As soon as a moment acts on a tilting edge of the driving shaft bearing, as would occur if the forces $F_{V1}$, $F_{V2}$ for example were of different magnitudes, the driving shaft pivots automatically together with the bearing segments in the direction of the arrow 33 into that position in which the two tangential forces $F_{V1}$ and $F_{V2}$ become of equal value. A corresponding effect is obtained for the forces $F_{R1}$ and $F_{R2}$. Thus, the resultant $R_V$ or $R_R$ of the tangential forces acts positively from the shaft centre 32 towards the tilting edge 23 or 24 and thus also at the indicated pressure angle $\alpha_{tV'}$ or $\alpha_{tR'}$.

Also, even if the angle $\alpha_{tV'}$ or $\alpha_{tR'}$ (related to the pressure angle and the pivot angle in the arrowed direction 33 or 34) is slightly changed as the gear becomes heated in operation, the pivoting movements of the driving shaft 5 in the direction of the arrow 33 or 34 and thus the degree of automatic adjustment are so small that there is hardly any significant inequality in the load distribution resulting therefrom.

What I claim and desire to secure by Letters Patent is:

1. A driving gear assembly comprising, in combination, a driving shaft, a driving gearwheel on said shaft, at least two intermediate shafts arranged in parallel with their axes in a common plane, the driving shaft axis being offset to one side of said common plane and respective gearwheels on said intermediate shafts meshing with the driving gearwheel, radial support bearing means for said driving shaft comprising means permitting displacement of the shaft axis substantially perpendicularly to the resultant force of two equal forces applied to the driving shaft gearwheel by the intermediate shaft gearwheels, said means permitting displacement comprising at least one element pivotally mounted in said bearing means and on which the driving shaft is supported to be pivotable about an axis parallel to the shaft axis in response to relative changes of the forces acting between the driving gearwheel and the intermediate shaft gearwheels for automatic adjustment of the position of the shaft in a direction transverse to its axis to equalise the load distribution between said intermediate shafts, said pivoting axis for the driving shaft being disposed on a line passing through the shaft axis and parallel to the direction of said resultant force.

2. A driving gear assembly according to claim 1 wherein said radial support bearing means are formed as tilting segment bearings for said pivoting movement of the driving shaft and the tilting segments of said bearings provide respective pivotally mounted elements on which the driving shaft is supported to be pivotable in the manner aforesaid.

3. A driving gear assembly according to claim 2 wherein each tilting segment bearing comprises at least one rotary bearing segment having a tilting element formed by a longitudinal protrusion or rib on the segment outer periphery.

4. A driving gear assembly according to claim 1 wherein the radial support bearing means have alternative elements permitting said pivoting movement of the driving shaft about respective axes for said automatic adjustment of the shaft position in either direction of rotation of the shaft.

* * * * *